United States Patent
Bainachi et al.

(10) Patent No.: US 7,533,533 B2
(45) Date of Patent: May 19, 2009

(54) JET ENGINE WITH A VARIABLE SECTION NOZZLE OF WHICH AT LEAST ONE FLAP PIVOTS ABOUT A PIN, PINS FOR FLAPS

(75) Inventors: Daniel Olivier Bainachi, Machault (FR); Mathieu Dakowski, Sucy en Brie (FR); Olivier Kreder, Chailly en Biere (FR); Romain Lunel, Brie Comte Robert (FR); Daniel Georges Plona, Vulaines sur Seine (FR)

(73) Assignee: SNECMA, Paris (FR)

( * ) Notice: Subject to any disclaimer, the term of this patent is extended or adjusted under 35 U.S.C. 154(b) by 603 days.

(21) Appl. No.: 11/236,576

(22) Filed: Sep. 28, 2005

(65) Prior Publication Data

US 2006/0225427 A1  Oct. 12, 2006

(30) Foreign Application Priority Data

Sep. 29, 2004  (FR)  .................................. 04 52195

(51) Int. Cl.
*F02K 1/00* (2006.01)
(52) U.S. Cl. .......................................... 60/771; 60/770
(58) Field of Classification Search ................. 60/771, 60/770, 230; 239/265.37, 265.39, 265.41
See application file for complete search history.

(56) References Cited

U.S. PATENT DOCUMENTS

| 3,504,902 | A | * | 4/1970 | Irwin | .......................... 267/152 |
| 3,612,106 | A |   | 10/1971 | Camboulives et al. | |
| 3,837,580 | A |   | 9/1974 | Camboulives et al. | |
| 4,641,783 | A | * | 2/1987 | Camboulives | .......... 239/265.39 |
| 5,893,518 | A | * | 4/1999 | Bruchez et al. | ........ 239/265.39 |

* cited by examiner

*Primary Examiner*—Michael Cuff
*Assistant Examiner*—Andrew Nguyen
(74) *Attorney, Agent, or Firm*—Oblon, Spivak, McClelland, Maier & Neustadt, P.C.

(57) ABSTRACT

The jet engine of the invention comprises an exhaust nozzle of variable section, comprising at least one flap pivot mounted about a pin, the pin being joined to the fixed structure of the jet engine via two braces each comprising a bore for housing the pin, the flap being pivot commanded by an actuating cylinder, connected to two fasteners which each comprise a bore through which the pin passes and about which they rotate. The jet engine is characterized by the fact that the pin, the bores of the braces and bores of the fasteners are arranged so that the contacts between the pin with the bore walls of the braces and with the bore walls of the fasteners are made over convex surfaces. Therefore, when in operation, in the event of pin bending the contact surfaces follow this convex shape and are suitably distributed.

14 Claims, 3 Drawing Sheets

JET ENGINE WITH A VARIABLE SECTION NOZZLE OF WHICH AT LEAST ONE FLAP PIVOTS ABOUT A PIN, PINS FOR FLAPS

BACKGROUND OF THE INVENTION

The invention concerns a jet engine with a variable section nozzle.

A jet engine generally comprises, from upstream to downstream in the direction of the gas stream, a fan, one or more compressor stages, a combustion chamber, one or more turbine stages and an exhaust duct, in which a so-called reheat or afterburner device may be provided.

The exhaust duct comprises a casing and a nozzle, in which the combustion gases expand. It is usual to use a nozzle of variable section, optionally with an afterburner device, to regulate the flow rate of the exhaust gases in relation to jet engine speed. Variable section nozzles may be of different types, in particular axisymmetrical, two-dimensional or swivelling. The invention applies to all types of variable section nozzles.

Variable section nozzles comprise flaps. With axisymmetrical nozzles for example the flaps are arranged in a ring, to obtain a globally circular section, and they partly overlap. Every other flap, called controlled flap, is actuated by an actuating cylinder, whilst between two controlled flaps there is a servo or follower flap driven by the controlled flaps.

Each controlled flap is connected to the fixed structure of the jet engine via a pin, around which it is pivot mounted. The pin extends transverse to the axis of the jet engine, between two longitudinal connecting braces for connection to the fixed structure, upstream of the flap. It is housed, at each of its ends, in a bore arranged in the braces and locked in translation and rotation with respect to the latter. Two fasteners are also mounted on the pin at a bore in one of their ends, each fastener being arranged adjacent to a connecting brace. These fasteners are connected to the actuating cylinder of the controlled flap and are mounted so as to pivot about the pin with friction thereupon to drive the flap pivotally under the action of its actuating cylinder.

The pin is cylindrical and the bore walls of the fasteners and connecting braces in contact with it are also cylindrical. The bearing surfaces of the pin in contact with the fasteners and connecting braces are coated with a protective coating, generally in cobalt and chromium carbide.

On account of fastener displacements, induced aerodynamic loads, vibrations and varying operating temperatures, the pin undergoes bending and high stresses on its bearing surfaces causing its wear. The displacements to which the fasteners are subject are chiefly of two types: short displacements related to low variations in the nozzle section about stable positions resulting from low variations in pressure on the flaps, and extensive displacements related to changes in nozzle section when in operation. Wear of the pin bearing surfaces is the consequence of either one of these types of displacements, or a combination of both.

Therefore bending of the pin reduces the contact surfaces between the pin with the fasteners and braces, these surfaces therefore no longer being cylindrical. Contact occurs in particular along the sharp edges of the fasteners and generates high stresses. Combined with the increased forces on the pin due to the forces of the fasteners, these phenomena lead to major local overpressures which are ill distributed and cause stripping of the pin coating. As wear increases in time, the bearing contact surfaces of the pin are shifted in the direction of the pin centre.

This wear of the pin considerably reduces its lifetime. It is therefore generally necessary to change a pin, whose lifetime is theoretically 1000 hours, after 500 hours. In addition to maintenance and replacement costs, there is a non-negligible risk of nozzle seizing. One solution which could be considered entails strengthening the pin, for example by increasing its diameter; however, this would increase the weight of the jet engine.

The present invention sets out to overcome these drawbacks.

BRIEF SUMMARY OF THE INVENTION

For this purpose, the invention concerns a jet engine comprising a variable section exhaust nozzle comprising at least one flap pivot-mounted about a pin, the pin being connected to the fixed structure of the jet engine by two connecting braces, each comprising a bore for housing the pin, the flap comprising two fasteners actuated by an actuating cylinder, each comprising a bore through which the pin passes, on which they are rotatably mounted, characterized by the fact that the pin, the bores of the braces and the bores of the fasteners are arranged so that the contacts between the pin with the bore walls of the braces and with the bore walls of the fasteners are made over convex surfaces.

With the invention, the pin is able to bend whilst maintaining suitably distributed contact surfaces with the braces and fasteners, since at each contact the surfaces are able to follow the convex shape.

Preferably, the convex surfaces are spherical.

Advantageously in this case the radii of curvature of the different convex surfaces are all identical.

According to a first embodiment, the pin comprises a cylindrical body, at each end of which there are two convex bearing surfaces intended to be in contact with the bore wall of a brace and the bore wall of a fastener respectively.

According to a second embodiment, a bushing comprising an inner convex wall is fixed in each bore for contact with the pin which is of cylindrical shape.

The invention also concerns a nozzle flap pin comprising a cylindrical body, at each end of which it comprises two convex bearing surfaces.

BRIEF DESCRIPTION OF THE DRAWINGS

The invention will be better understood with the following description of the preferred embodiment of the invention with reference to the appended drawing in which.

DETAILED DESCRIPTION OF THE INVENTION

Figure 1:
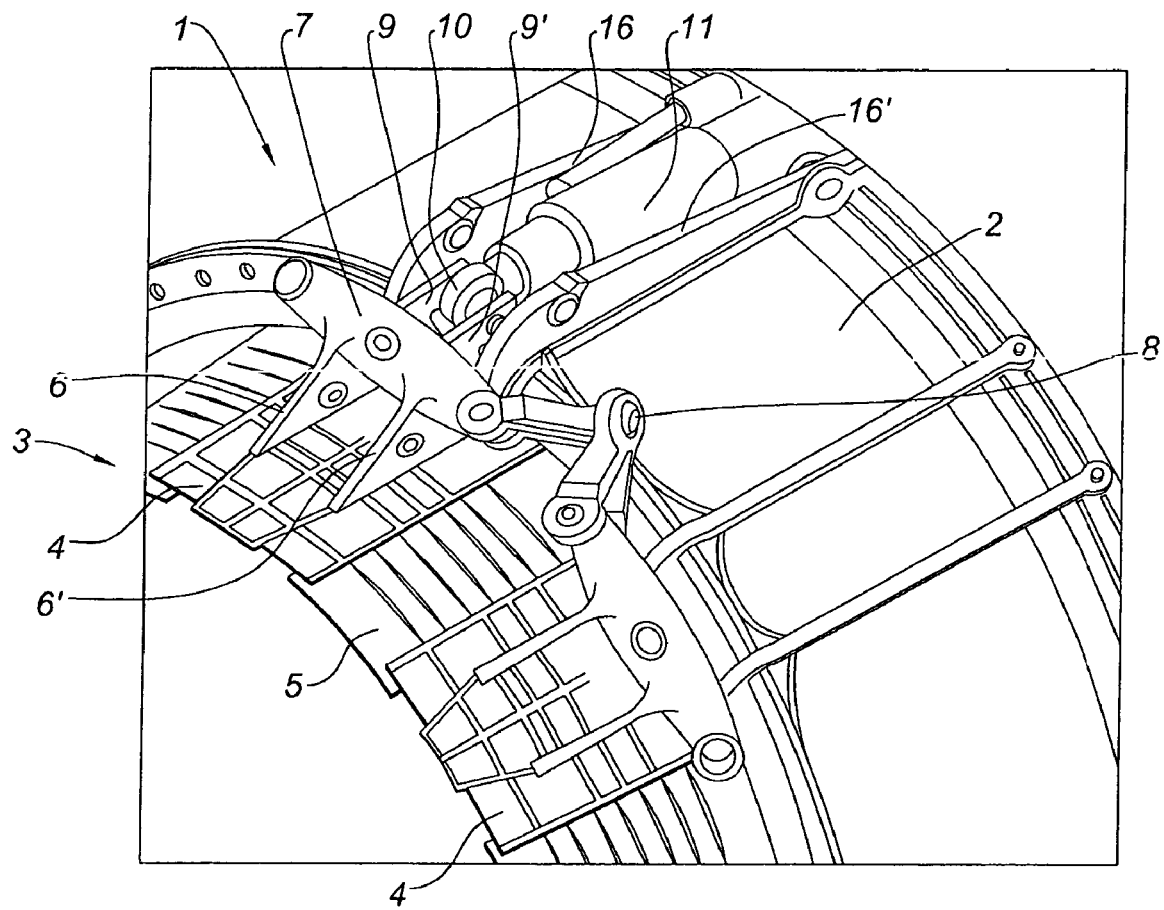
FIG. 1 shows a partial, schematic, downstream view of the jet engine nozzle of the invention.
Figure 2:
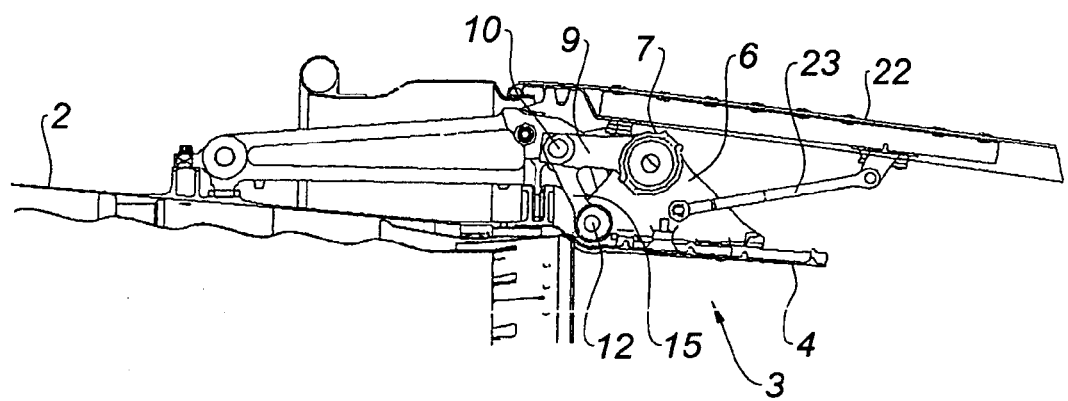
FIG. 2 is a schematic, cross-sectional, profile view of the jet-engine nozzle of the invention.
Figure 3:
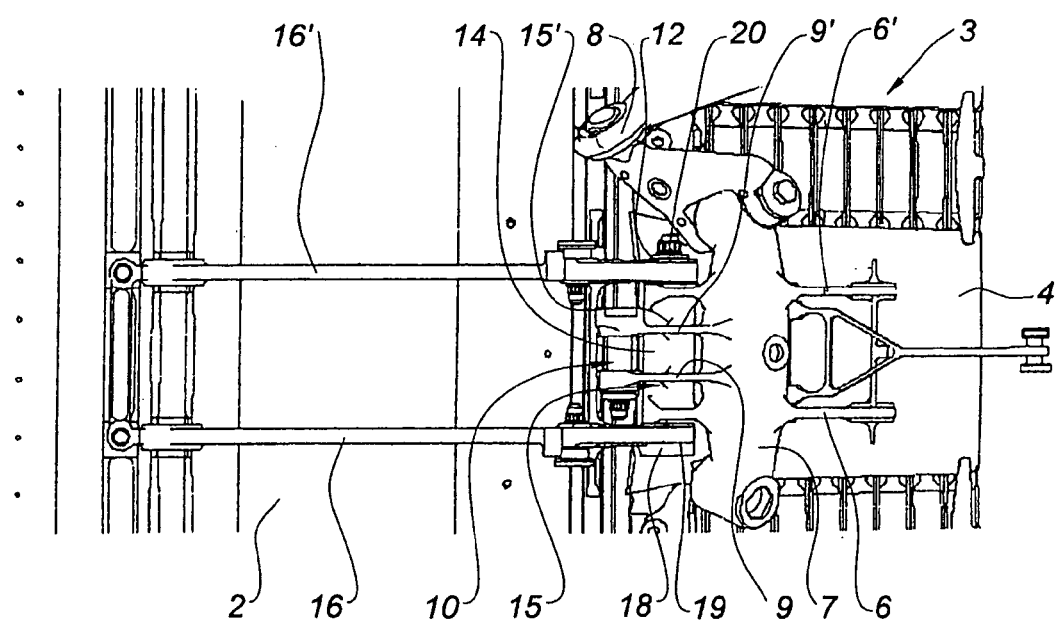
FIG. 3 is a partial, schematic, side view of the jet engine nozzle of the invention.

With reference to FIGS. 1, 2 and 3, the jet engine of the invention, from upstream to downstream in the direction of the gas stream, which globally follows a direction forming the axis of the jet engine, comprises a fan, one or more compressor stages, a combustion chamber, one or more turbine stages, not shown, an exhaust duct 1 in which a so-called reheat or afterburner device is provided, through which the fuel is injected into the exhaust duct to generate additional thrust.

The exhaust duct 1 here comprises an afterburner casing 2 downstream of which extends a nozzle 3, in which the combustion gases derived from the combustion chamber expand. The nozzle 3 is of variable section; here it is a convergent axisymmetrical nozzle. It comprises a plurality of flaps 4, 5 arranged in a ring on the downstream side of the afterburner casing 2. Each flap 4, 5 is pivot mounted about a pin 12. Every other flap, called controlled flap 4, is actuated by an actuating cylinder, whilst between two controlled flaps 4 there is a servo flap 5 or follower flap 5 driven by the controlled flaps 4.

With reference to FIG. 2, flaps 22 are arranged around the nozzle 3. These are flaps 22 of the jet engine secondary airstream, here connected to flaps 4 of the nozzle by connecting rods 23. These flaps 22 do not influence the invention however and are not shown in FIG. 2.

A particular controlled flap 4 of nozzle 3 is described below, all the other controlled flaps 4 being identical therewith.

Flap 4 is in the shape of a rectangular plate for example. It is pivot mounted on its upstream side about a pin 12 which extends perpendicular to the jet engine axis and is fixedly connected to the afterburner casing 2 via connecting braces 16, 16' as will be seen below. Flap 4 is controlled by an actuating cylinder 11 mounted on the outer wall of the afterburner casing 2. A single actuating cylinder 11 is shown, solely in FIG. 1, but each controlled flap 4 has a dedicated actuating cylinder 11. The actuating cylinder 11 and flap 4 are joined together via a linkage 7 here a cross-piece 7 with a globally ovoid-shaped body.

The linkage 7 comprises an upstream clevis located centrally and projecting from its ovoid body which comprises two lugs 9, 9' extending longitudinally towards upstream and connected to a pin 10 made integral with the actuating cylinder 11 and housed in the mobile head of the actuating cylinder 11. It also comprises, projecting radially, a radial clevis which comprises two fasteners 6, 6' of globally triangular shape fixed to the controlled flap 4. One side of the triangle formed by each fastener 6, 6' extends longitudinally along flap 4 on which it is fixed, from its upstream edge; the two other sides extend radially between the ovoid body of the linkage 7 and the flap 4. The upstream clevis and the radial clevis together form an angle drive between the actuating cylinder 11 and the flap 4. Each side end of the ovoid body of linkage 7 is joined to the side end of the linkage 7 of the following controlled flap 4 by a connecting clevis 8.

Flap 4 is articulated about pin 12 via the upstream tip of fasteners 6, 6' through which pin 12 passes via bores 13, 13' respectively provided for this purpose. A sleeve 14, made integral with fasteners 6, 6' surrounds pin 12 between the two bores 13, 13' of fasteners 6, 6' without contacting pin 12 outside bores 13, 13'. Also, two lugs 15, 15' join the sleeve 14 to the pin 10 integrally joined to the actuating cylinder 11.

The fasteners 6, 6' are pivot mounted at their bores 13, 13' about pin 12. The actuating cylinder 11 can therefore actuate the controlled flap 4 and drive it pivotally about this pin 12 via fasteners 6, 6' forming levers. The integral assembly formed by the linkage 7, fasteners 6, 6' and sleeve 14 form a lever.

In the upstream continuation of the controlled flap 4, the afterburner casing 2, on its outer wall, comprises two flanges, here longitudinal flanges 16, 16' called braces 16, 16'. These braces 16, 16' extend either side of the actuating cylinder 11 which is fixed to them, and their downstream end projects outside the afterburner casing 2 towards the flap 4. The end of each brace 16, 16' comprises a bore 17, 17' respectively housing the ends of pin 12 about which fasteners 6, 6' are pivot mounted. The braces 16, 16' are used to fix the pin 12 with respect to the fixed structure of the jet engine. The pin 12 at one of its ends comprises a D-shaped head 18 which is locked in rotation in a housing 19 of the corresponding brace 16, whilst the other end is locked in translation by a bolt 20 screwed against the other brace 16'.

By "bearing surfaces" is meant the surfaces of pin 12 intended to come into contact with the bore walls 13, 13' of fasteners 6, 6' and the bore walls 17, 17' of braces 16, 16'. The invention lies in the arrangement of pin 12 and these various bores 13, 13', 17, 17' so that the contact between them is made over convex surfaces i.e. curved surfaces in the direction of pin 12, in other words surfaces with revolution symmetry derived from curved generating lines.

Figure 4:
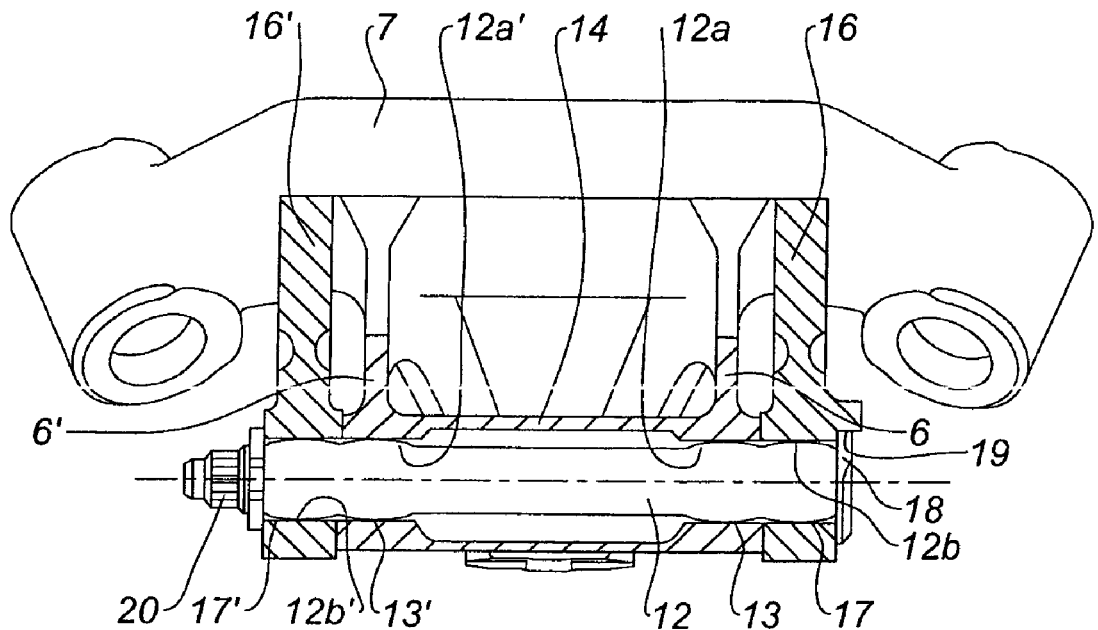
FIG. 4 is a partial, schematic, cross-sectional upstream view of a first embodiment of an exhaust flap of the jet engine of the invention.

According to a first embodiment shown FIG. 4, the pin 12 comprises a cylindrical body with, at each of its ends, two convex bearing surfaces (12a, 12b), (12a', 12b') following each other on pin 12. It is to be noted that FIG. 4 is not drawn to scale to facilitate comprehension. The bearing surfaces 12a, 12a' located the nearest to the centre of pin 12 are intended to come into contact with the walls of bores 13, 13' of fasteners 6, 6'; the bearing surfaces 12b, 12b' the furthest away from the centre of pin 12, namely those located in the vicinity of D-shaped head 18 and bolt 20 respectively are intended to come into contact with the walls of bores 17, 17' of braces 16, 16'. Bores 13, 13' of fasteners 6, 6' and bores 17, 17' of braces 16, 16' are cylindrical.

Therefore the contact between bearing surfaces 12a, 12a', 12b, 12b' of pin 12 with the bore walls 13, 13' of fasteners 6, 6' and the bore walls 17, 17' of braces 16, 16' is made over convex surfaces. The convex surfaces are preferably spherical, i.e. each derived from a generatrix in the arc of a circle. Here pin 12 has a diameter of 15 mm, outside its convex bearing surfaces, and the radii of curvature of bearing surfaces (12a,12b), (12a',12b') are all identical and equal to approximately 300 mm.

Here there is tangential continuity between the two convex bearing surfaces (12a,12b), (12a',12b') following each other at each end of pin 12; the shape of the pin between the convex bearing surfaces is cylindrical with rounded connecting portions having a reverse radius of curvature with respect to that of the convex portions (12a,12b), (12a',12b').

Figure 5:
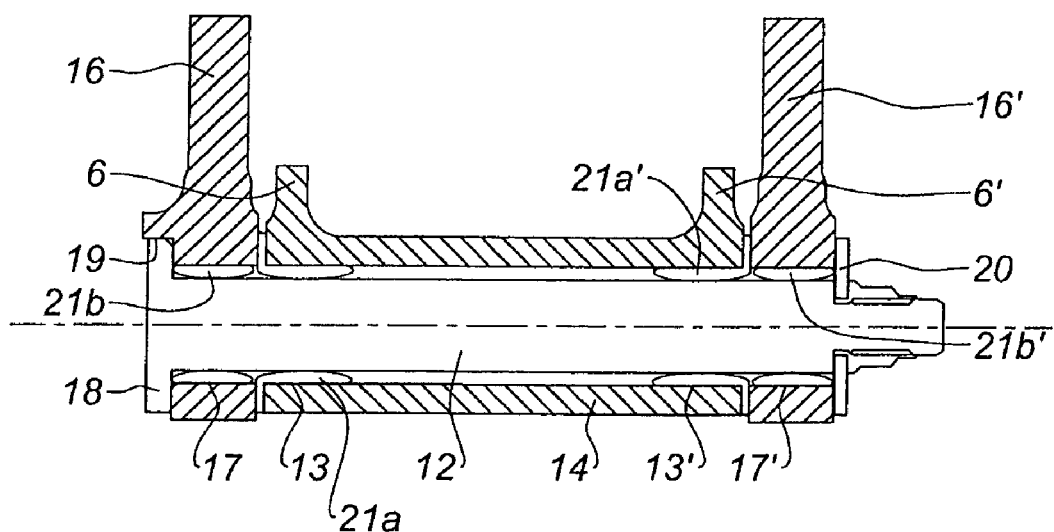
FIG. 5 is a partial, cross-sectional, downstream, schematic view of a second embodiment of an exhaust flap of the jet engine of the invention.

According to the second embodiment illustrated very schematically FIG. 5, the pin 12 is of cylindrical shape and bushings (21a, 21a'), (21b, 21b') with inner convex surface are mounted in the bores 13, 13' of fasteners 6, 6' and bores 17, 17' of braces 16, 16' respectively. Here, bores 13, 13' of fasteners 6, 6' are cylindrical in the alignment of the inner wall of sleeve 14 joining fasteners 6, 6' together, and therefore forming with this wall a continuous channel of constant diameter, bushings 21a, 21a' being fixed to the walls of bores 13, 13' and ensuring contact with pin 12 via their inner convex surface. Similarly, bores 17, 17' of braces 16, 16' are cylindrical and bushings 21b, 21b' are fixed to their wall to ensure contact with pin 12 via their inner convex surface.

The inner convex surfaces of bushings 21a, 21b, 21a', 21b' are preferably spherical i.e. each derived from a generating line in an arc of a circle and their radii of curvature here are all identical and equal to approximately 300 mm, the diameter of pin 12 being 15 mm. It is to be noted that FIG. 5 is not drawn to scale to facilitate comprehension.

The functioning of the jet engine of the invention will now be described in more detail. It is comparable for the two above-described embodiments.

A change in section of nozzle 3 is obtained by pivoting the controlled flaps 4 about their pin 12, the controlled flaps 4, through their pivoting, causing the pivoting of the servo flaps 5. Each servo flap 5 also pivots about a pin, not shown, but their structure is different to that of the controlled flaps. The invention could however also be applied to the pins of the servo flaps and to their receiving bores. The pivoting of a controlled flap 4 is obtained by its actuating cylinder 11 which drives linkage 7 via its integrally joined lugs 9, 9', to cause pivoting of fasteners 6, 6' and hence of the controlled flap 4 about pin 12.

The aerodynamic loads transmitted by fasteners 6, 6' to pin 12 may cause its bending. With the invention, this bending does take place but it is accompanied by contact on convex surfaces between the bearing surfaces of pin 12 with the bore walls of fasteners 6, 6' and braces 16, 16', this contact here being ensured either directly by the convex bearing surfaces of pin 12 or via bushings with inner convex wall fixed in the bores. In other words, the contact follows the generating line of the convex contact surface. It is to be noted that the bore walls of fasteners 6, 6' and braces 16, 16' comprise the walls of bushings 21a, 21b, 21a', 21b'.

Therefore pin 12, when it bends, follows these convex contact surfaces. The distribution of the contact surfaces therefore remains globally constant irrespective of the bending state of pin 12. The Applicant has found that it is not necessary to make provision for different radii of curvature between the convex contact surfaces located the nearest to the centre of pin 12 and the convex contact surfaces located the furthest distant from the pin centre, in particular due to the size of these radii with respect to the diameter of pin 12. However, this evidently could be the case, for example to further fine-tune the distribution of stresses.

Through the invention it has therefore been possible to eliminate the additional stresses related to changes in the contact surfaces and in particular to the onset of contact surfaces on the sharp edges of the bore walls, which set up edge effect stresses, as was the case with prior art flaps. The stresses undergone by pin 12 are therefore continuous in time and only result from aerodynamic stresses and no longer from changes in the distribution of the contact surfaces.

With the invention the lifetime of the pins 12 is considerably increased and the risk of nozzle seizing is reduced. Maintenance and replacement costs are lowered as well as manufacturing costs since it is no longer necessary to provide a coating on the bearing surfaces of pin 12.

The pin 12 here is in a nickel-based alloy, for example of the registered Waspalloy or Inco 718 trade mark, but evidently another material could be chosen. Also, in the invention the convex contact surfaces are either convex bearing surfaces directly formed on pin 12 or the inner surfaces of bushings fixed in the bores of fasteners 6, 6' and braces 16, 16', but evidently other configurations are possible; it could be proposed for example that the bore walls of fasteners 6, 6' and braces 16, 16' be machined so as to be convex and to cooperate with the cylindrical bearing surfaces of the pin, or convex surfaces could be proposed both on pin 12 and on the bore walls or the inner walls of the bushings fixed therein, contact then being made between two convex surfaces, or further various combinations of these configurations. A varnish could also be added to the convex contact surfaces or the surfaces on which they are in contact in order to reinforce their resistance.

The invention claimed is:

1. A jet engine comprising:
    an exhaust nozzle of variable section, the exhaust nozzle including at least one flap pivotably mounted about a pin, the pin being coupled to the fixed structure of the jet engine by two braces, the braces each comprising a bore that houses the pin, the flap including two fasteners actuated by an actuating cylinder, each fastener including a bore through which the pin passes, and on which pin the fasteners are rotatably mounted to rotate about an axis of rotation,
    wherein the pin, bores of braces and bores of fasteners are arranged so that the contact between the pin and bore walls of braces and contact between the pin and bore walls of fasteners is made over spherical convex surfaces.

2. The jet engine as in claim 1, wherein the convex surfaces are spherical.

3. The jet engine as in claim 2, wherein the radii of curvature of the convex surfaces are all identical.

4. The jet engine as in claim 3, wherein the pin has a diameter of 15 mm and the convex surfaces have a radius of curvature of approximately 300 mm.

5. The jet engine as in claim 1, wherein the pin comprises a cylindrical body, each end of which cylindrical body includes two convex bearing surfaces configured to be in contact with the bore wall of a brace and the bore wall of a fastener.

6. A jet engine comprising:
    an exhaust nozzle of variable section, the exhaust nozzle including at least one flap pivotably mounted about a pin, the pin being coupled to the fixed structure of the jet engine by two braces, the braces each including a bore that houses the pin, the flap including two fasteners actuated by an actuating cylinder, each fastener including a bore through which the pin passes, and on which pin the fasteners are rotatably mounted,
    wherein a bushing including a convex inner wall is fixed in each bore so as to be in contact with the pin, which pin is cylindrical.

7. The jet engine of claim 5, wherein the pin comprises a cylindrical body each end of which cylindrical body includes two convex bearing surfaces.

8. The jet engine as claimed in claim 7, wherein there is tangential continuity between the two convex bearing surfaces of each end.

9. The jet engine as claimed in claim 7, wherein all the convex bearing surfaces are spherical and have the same radius of curvature.

10. The jet engine as claimed in claim 9, wherein the body has a diameter of 15 mm and the convex bearing surfaces have a radius of curvature of approximately 300 mm.

11. The jet engine as claimed in claim 1, wherein the pin includes first and second convex surfaces immediately adjacent each other and disposed closer to a first end of the pin than to a second end of the pin.

12. The jet engine as claimed in claim 11, wherein the pin includes third and fourth convex surfaces immediately adjacent each other and disposed closer to a second end of the pin than to a first end of the pin.

13. The jet engine as claimed in claim 1, wherein the convex surfaces are convex as viewed along a direction perpendicular to the axis of rotation.

14. The jet engine as claimed in claim 11, wherein the convex surfaces are convex as viewed along a direction perpendicular to the axis of rotation.

* * * * *